(12) United States Patent
Do et al.

(10) Patent No.: US 8,387,050 B2
(45) Date of Patent: *Feb. 26, 2013

(54) SYSTEM AND METHOD TO DYNAMICALLY MANAGE APPLICATIONS ON A PROCESSING SYSTEM

(75) Inventors: Lydia Mai Do, Research Park Triangle, NC (US); Jason Alan Cox, Raleigh, NC (US); Kimberly Marie Fernsler, Round Rock, TX (US); Michael Lance Karm, Cedar Park, TX (US); Brian Robert Mestan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

This patent is subject to a terminal disclaimer.

(21) Appl. No.: 12/132,823

(22) Filed: Jun. 4, 2008

(65) Prior Publication Data

US 2009/0307692 A1 Dec. 10, 2009

(51) Int. Cl.
*G06F 9/445* (2006.01)

(52) U.S. Cl. ....................................... 718/100

(58) Field of Classification Search .................. None
See application file for complete search history.

(56) References Cited

U.S. PATENT DOCUMENTS

| | | | |
|---|---|---|---|
| 5,175,854 A | 12/1992 | Cheung et al. | |
| 5,625,783 A | 4/1997 | Ezekiel et al. | |
| 5,726,688 A | 3/1998 | Siefert et al. | |
| 5,897,670 A | 4/1999 | Nielsen | |
| 6,108,714 A | 8/2000 | Kumagai et al. | |
| 6,121,968 A | 9/2000 | Arcuri et al. | |
| 6,633,758 B1 | 10/2003 | Heinonen et al. | |
| 6,839,836 B2 | 1/2005 | Cole et al. | |
| 7,103,642 B1 | 9/2006 | Chen et al. | |
| 7,159,217 B2 * | 1/2007 | Pulsipher et al. ............. 718/100 |
| 7,293,242 B2 | 11/2007 | Cossey et al. | |
| 7,296,144 B2 | 11/2007 | Bryant-Rich et al. | |
| 7,765,556 B2 | 7/2010 | Hauser et al. | |
| 2003/0167351 A1 * | 9/2003 | Hauser et al. ................. 709/318 |
| 2009/0307693 A1 | 12/2009 | Do et al. | |

OTHER PUBLICATIONS

Caolo, Dave. "Trigger an Automater workflow by plugging in a digital camera". Aug. 10, 2005. 5 pages.*
"Auto Close Idle", author unknown. Feb. 2, 2007. 3 pages.*
USPTO Office Action regarding U.S. Appl. No. 12/133,252, dated Aug. 24, 2011.
"Runclick 1.0.1," File Dudes, http://www.filedudes.com/RunClik-download-23038.html, published as early as Oct. 2005, accessed Jun. 4, 2008, 3 pages.
"Shutdown Utilities," SnapFiles, http://www.snapfiles.com/freeware/system/fwshutdown.html, published as early as Apr. 2003, accessed Aug. 17, 2011, 5 pages.
"Magic Launcher downloads," Surfpack, http://magiclaucher.surfpack.com, published as early as Aug. 2007, accessed Jun. 4, 2008, 4 pages.
Pash "Hack Attack: Using Windows Schedule Tasks," Lifehacker, http://lifehacker.com/153089/hack-attack-using-windows-scheduled-tasks, published Feb. 7, 2006, accessed Feb. 22, 2012, 5 pages.
Final Office Action, dated Feb. 28, 2012, regarding USPTO U.S. Appl. No. 12/133,252, 18 pages.

* cited by examiner

*Primary Examiner* — Robert Fennema
(74) *Attorney, Agent, or Firm* — Yee & Associates, P.C.; Catherine Ivers

(57) ABSTRACT

A method and system in accordance with the present invention provides an intelligent prediction approach for populating and depopulating multiple applications at the system level across applications. The detection and management of user behavior patterns to anticipate the user's next request is provided. Further the present invention is to account for a situation to relate dynamically to user behavior and where that user behavior changes to adjust so as to more accurately set forth a desired result for a user of the present invention. The present invention in various implementations provides an intelligent prediction scheme for populating and depopulating multiple applications at the system level across a diversity of applications.

18 Claims, 7 Drawing Sheets

SYSTEM AND METHOD TO DYNAMICALLY MANAGE APPLICATIONS ON A PROCESSING SYSTEM

CROSS-REFERENCE TO RELATED APPLICATIONS

This application is related to co-pending patent application filed concurrently on even-date herewith, entitled, "System and Method to Dynamically Manage Applications on a Processing System" as application Ser. No. 12/133,252, all of which is incorporated herein by reference.

FIELD OF THE INVENTION

The present invention relates generally to processing systems and more specifically to a system and method for managing applications involving a processing system.

BACKGROUND OF THE INVENTION

As computers become more powerful and the capacity of mass storage devices (e.g. hard drives) rapidly increases, users are able to store an increasing amount of information as well as load numerous applications of varying types onto their computers. With this being the case, often it becomes time-consuming and difficult to efficiently identify, locate and instantiate or launch the various needed applications and information in an efficient, convenient, and timely manner. Further, as is becoming more commonplace, the ability to rapidly identify a sought application on a computer having numerous applications, presents a user with additional challenges. As computer users often run multiple applications during active sessions, the time and effort needed by a user to identify, locate and activate or launch each of those needed applications during the course of their regular activities often distracts, interrupts, and delays a user from accomplishing their primary work task during the session.

Conventional approaches in the field offer a user limited options, each of which only provide a user with further limitations in attempting to overcome the above issues. For instance, conventional approaches are known to include "Adaptive Graphical User Interfaces," "Context-Based Graphical User Interfaces," "Application Launching Utilities," and "Application Grouping Utilities," each of which is further discussed below.

Adaptive Graphical User Interfaces

It will be understood by those skilled in the art that an Adaptive Graphical User Interface typically adapts a graphical user interface (GUI) in response to what is understood to be the needs of the user in a limited context. In an Adaptive Graphical User Interface, typically icons and menus are manipulated to reflect suggestions for options in the menu, for instance, or may actually modify a menu for a particular user based on the user's experience with a particular feature. For example, an Adaptive Graphical User Interface may be configured to automatically determine and organize selectable elements on a GUI as being those elements which are selected most frequently by a user. In such an example, the selectable elements would be organized on an area of the GUI which could be easily selected by a user for instance. Typically, these conventional designs modify the menu options presented to a user based on prior usage or estimated experience with a feature. In some instances, an option may be suggested for execution or even be configured for automatic execution.

In a further example, Microsoft® Word's simple-to-expandable menu structure is another example of an Adaptive Graphical User Interface approach. In this example, usage by the user typically determines which items are thereafter presented or hidden in the menubar. Additionally, it will be appreciated by those skilled in the art that Adaptive Graphical User Interfaces typically only filter the numerous options available to a user and present a limited set of options, which ideally are only the options the user is considering at that particular moment.

Therefore, as is evident from the Adaptive Graphical User Interface approach, there are very specific limitations to overcome the above issues, including: (1) these types of conventional interfaces are restricted to a specific application and are incapable of grouping sets of applications, for instance, that may be used together by a user when performing a task; (2) the adaptive interface is constructed from a predefined set of interfaces, such that it is not constructed on-the-fly, nor is the user able to create their own customized interface; and, (3) options for the user's interests are not automatically selected nor are such preloaded in preparation for their use by the user.

Context-Based Graphical User Interfaces

It will be understood by those skilled in the art that a Context-Based Graphical User Interface presents an interface based on the context of the current user experience. This context can be based on, for example, the role the user is playing at a particular time or on a particular day (e.g., whether the user is expected to be working or relaxing), or the context may be based on the current location of the user (e.g., whether the user is most likely at home or at work). In certain of these types of interfaces, a set of contexts is first defined, each of which may be associated with one or more user interface (UI) elements that can be used to build a user interface most suitable to that context. It will be appreciated by those skilled in the art that the UI elements typically include such information as user preferences, favorites lists, toolbars, default directories, etc., and each of the UI elements corresponds to one or more of the predefined contexts. In one example, where a user logs into a computer system, a contextual engine residing in the host computer determines the context of the current experience, and provides a user interface built from the UI elements associated with that context to the user.

Therefore, as is evident from the Context-Based Graphical User Interface approach, there are very specific limitations to overcome the above issues, including: (1) there is no automatic creation of a context or dynamic modification of the options that are presented in each context; rather, a predefined interface is presented when a context is detected; and, (2) there is no automatic execution of the programs in a context based on prior use, time of day, etc.

Application Launching Utilities

It will be understood by those skilled in the art that an Application Launching Utility creates program groups that can be launched at a later time in a simpler fashion (e.g., a single mouse click) moreso than launching each program in the program group separately. In such situations, the user is typically responsible for the creation of the group and to determine the contents of the group. Further, once a group is created, it remains static.

Therefore, as is evident from the Application Launching Utility approach, there are very specific limitations to overcome the above issues, including: there is no automatic creation or dynamic modification of groups provided for.

Application Grouping Utilities

It will be understood by those skilled in the art that Application Grouping Utilities typically chain applications together provided those applications work on a common set of data or are otherwise involved in a fixed fashion. For example, a circuit designer may first bring up a schematic editor to design a circuit, then the designer may bring up a simulator to time the design, and finally the designer may bring up a waveform viewer to analyze the timing results. Since these applications pass data from one to the other, an Application Grouping Utility would typically group these three applications together and present them as a single task group on the user interface. In operation, the Application Grouping Utilities found above, for instance, require that the group be created by the user, without automation or influence as to prior use by the user. To create the groups, the user must invoke an "automatic group" request to thereafter group the next applications sequentially invoked by the user.

Therefore, as is evident from the Application Grouping Utilities approach, there are very specific limitations to overcome the above issues, including: (1) there is no automatic creation or dynamic modification of groups based on prior usage; and, (2) the order that the applications are invoked determines how the group is actually created, where a change in order would change how the group is presented.

Accordingly, in view of these conventional approaches which do not address or overcome the above issues, what is needed is a dynamic way to launch multiple applications that is able to be launched based upon a user's needs. Accordingly, a system and method that provides fast, convenient access to applications and information at the most appropriate time for a particular user is needed. The present invention addresses such a need.

SUMMARY OF THE INVENTION

A method and system in accordance with the present invention provides an intelligent prediction approach for populating and depopulating multiple applications at the system level. The detection and management of user behavior patterns to anticipate the user's next request is provided. Further the present invention is to account for a situation to relate dynamically to user behavior and where that user behavior changes to adjust so as to more accurately set forth a desired result for a user of the present invention.

A method and system for dynamically managing applications on a processing system is disclosed. In a first aspect, a method for dynamically managing a plurality of applications on a processing system is provided. The method comprises providing an active session in a processing system; one of automatically or non-automatically populating the plurality of applications in the active session in relation to one or more behavior patterns of a user including one or more of the user's past usage patterns and present usage patterns; and providing for a capability to depopulate one or more of the plurality of applications in relation to one or more predetermined depopulating characteristics.

In a second aspect, a method for adaptively managing a plurality of applications on a computer-based processing system including a computer, a camera, and program applications resident on the computer, is provided. The method comprises: providing an active session on the computer; detecting a presence of the camera being interoperable with the computer; automatically or non-automatically populating the plurality of applications in the active session in relation to one or more behavior patterns, including one or more of the user's past usage patterns and present usage patterns corresponding to the detected camera, wherein each of the plurality of applications have a common context, and providing for a capability to depopulate one or more of the plurality of applications upon detecting a removal of the detected presence of the camera or the inoperability of the camera with the computer, wherein the behavior patterns are determined in relation to a history of applications corresponding to the context of the applications.

In a further aspect, a computer system comprising a processor; a storage medium; and a computer readable memory coupled to the processor and containing program instructions that, when executed, implement a method in an active session of a processing system is provided for. The program instructions of the computer system provide for automatically populating the plurality of applications in the active session in relation to one or more behavior patterns of a user including one or more of the user's past usage patterns and present usage patterns. The program instructions further provide for a capability to depopulate one or more of the plurality of applications in relation to one or more predetermined depopulating characteristics.

DETAILED DESCRIPTION OF PREFERRED EMBODIMENTS

The present invention relates generally to processing systems and more specifically to a system and method for managing applications on a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1A:
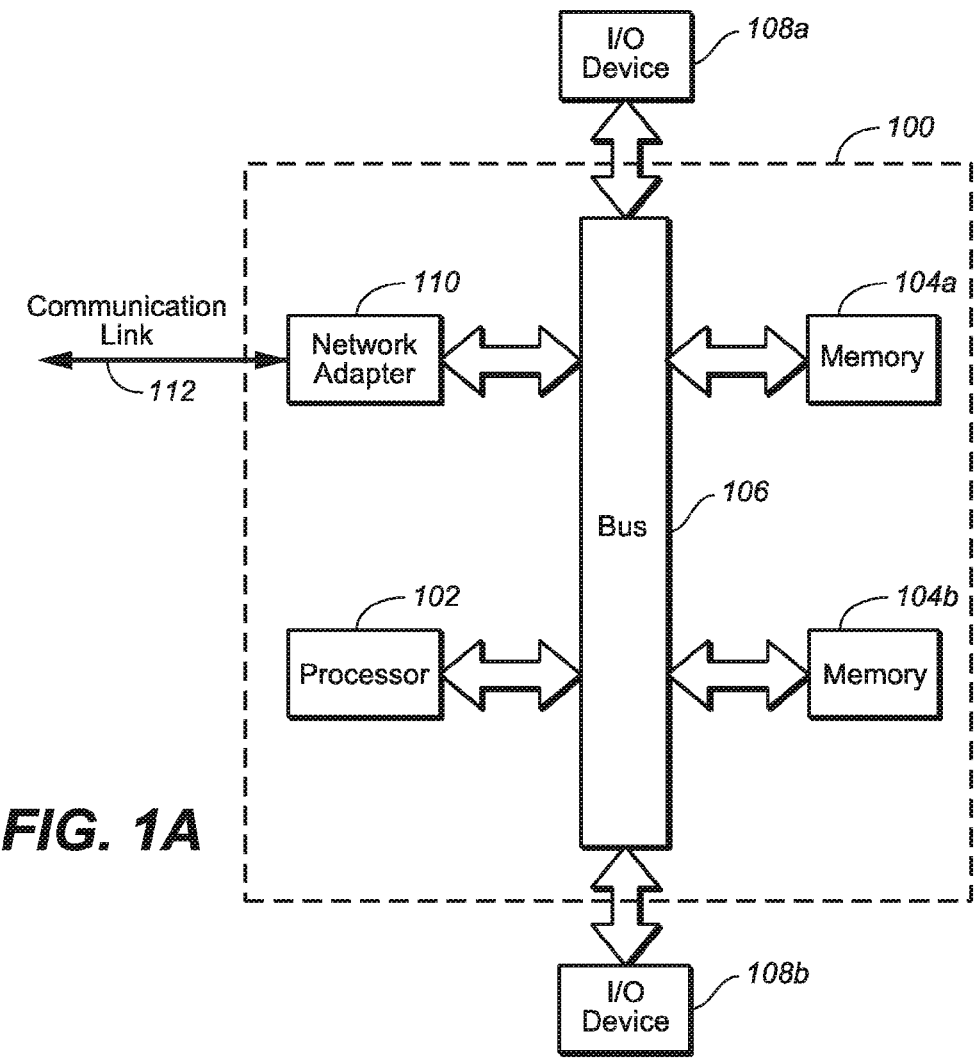
FIG. 1A is a diagram of a processing system in accordance with an implementation of the present invention.

FIG. 1A is a diagram of a processing system 100 in accordance with an implementation of the present invention. FIG. 1 depicts a data processing system 100 suitable for storing and/or executing program code related to the parsing process. Data processing system 100 includes a processor 102 coupled to memory elements 104a-104b through a system bus 106. In other implementations, data processing system 100 may include more than one processor and each processor may be coupled directly or indirectly to one or more memory elements through a system bus.

Memory elements 104a-104b can include local memory employed during actual execution of the program code, bulk storage, and cache memories that provide temporary storage of at least some program code in order to reduce the number of times the code must be retrieved from bulk storage during execution. Memory elements may also include temporary memory and may include signals transmitted within the data a processing system resident in a permanent or temporary with one or more memory elements. As shown, input/output or I/O devices 108a-108b are preferably interoperably coupled to data processing system 100. I/O devices 108a-108b may be coupled to data processing system 100 directly or indirectly through intervening I/O controllers (not shown).

In the implementation, a network adapter 110 is coupled to data processing system 100 to enable data processing system 100 to become coupled to other data processing systems or remote printers or storage devices through communications link 112. Communication link 112 can be a private or public network. Modems, cable modems, and Ethernet cards are just a few of the currently available types of network adapters. In a further preferred aspect, a communication link 112 is provided for communication through a network adapter of the processing system 100 wherein the communication may be of any form or format including wired, wireless, Bluetooth®, etc., or other communication form. Bluetooth® is a registered trademark of Bluetooth Sig, Inc. Program instructions of the present invention are provided within the processing system, and preferably within programs via one or more memory elements in communication with the processor, though the present invention is not required to have program instructions resident with the processing system.

A system and method in accordance with the present invention includes at least one of two actions: populating a group of applications in the active session of a host computing system based upon the user's behavior patterns and depopulating a group of applications based upon a user behavior pattern. According to a user's past and present usage patterns, applications (and application data) are automatically presented to the user in anticipation of a need (or the end of a need) according to one of a variety of options. In an embodiment these actions are performed by a software mechanism as described in detail below. To describe the present invention in more detail, refer now to the following description in conjunction with the accompanying Figures.

Figure 1B:
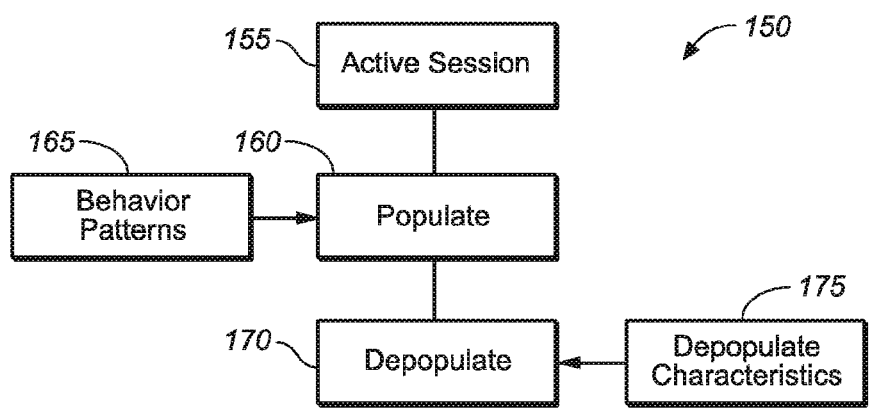
FIG. 1B is a flow chart of a method for dynamically managing applications on a processing system in accordance with an implementation of the present invention.

FIG. 1B is a flow chart of a method 150 for dynamically managing applications on a processing system in accordance with an implementation of the present invention. From FIG. 1B, an active session in a processing system is provided at 155. An automatic populating of multiple applications in the active session in relation to one or more behavior patterns 165 occurs at 160. A capability for depopulating one or more of the multiple applications in relation to predetermined populating characteristics 175 is provided at 170. It should be understood that actions can be performed together or separately dependent upon the applications.

Preferably, behavior patterns include information obtained concerning the user's use of applications in relation to one another during active sessions of the use, where, for instance a user may typically always open application "A" at start, open application "B" within five minutes thereafter, and require application "C" at the closure of application "A" but before the end of the session of application "B." Accordingly there are numerous relationships and combinations available using the present invention, however, the user's use of applications in relation to one another, without limitation, during a user's active sessions are intended to set forth behavior patterns, past and present, as used herein. Additionally a user's behavior pattern may include information as to the uses of how the applications are implemented and with what supporting linkages, data, and the like, as utilized by the user. For instance, a music player application may have behavior patterns of a user that indicate a user typically plays music on the music player from a predetermined music play list or a webpage. In one or more implementations, the present invention uses, in one aspect, a user's behavior patterns to determined which applications to launch, when and in what order, without additional input from a user. In one or more implementations, the present invention also uses, in another aspect, a user's behavior patterns to determine which applications to close, when and in what order, without additional input from a user. Further details are set forth herein and below.

Preferably populating approaches of the present invention include but are not limited to common context of applications, concurrent applications in use, time capture of sequential application, and combinations of the aforementioned approaches, for instance. It will be further appreciated that populating may include identifying or using parameters or information having thresholds for a maximum number of applications to group (or populate) simultaneously, maximum or minimum time between user input events used to distinguish unique operating sessions or applications of a similar task, and/or presentation action to take when populating, for example. Further details are set forth herein and below.

Preferably depopulating characteristics include approaches in which the user's behavior patterns reflect how applications are closed or completed in relation to one another following their open or use by the user, and these characteristics may include, by example, relationship of open application Z1 following the closing of first opened application Y1 and close Z1 concurrently with the closing of originally opened application X1. Further details are set forth herein and below.

Example of a Preferred Implementation

Figure 1C:
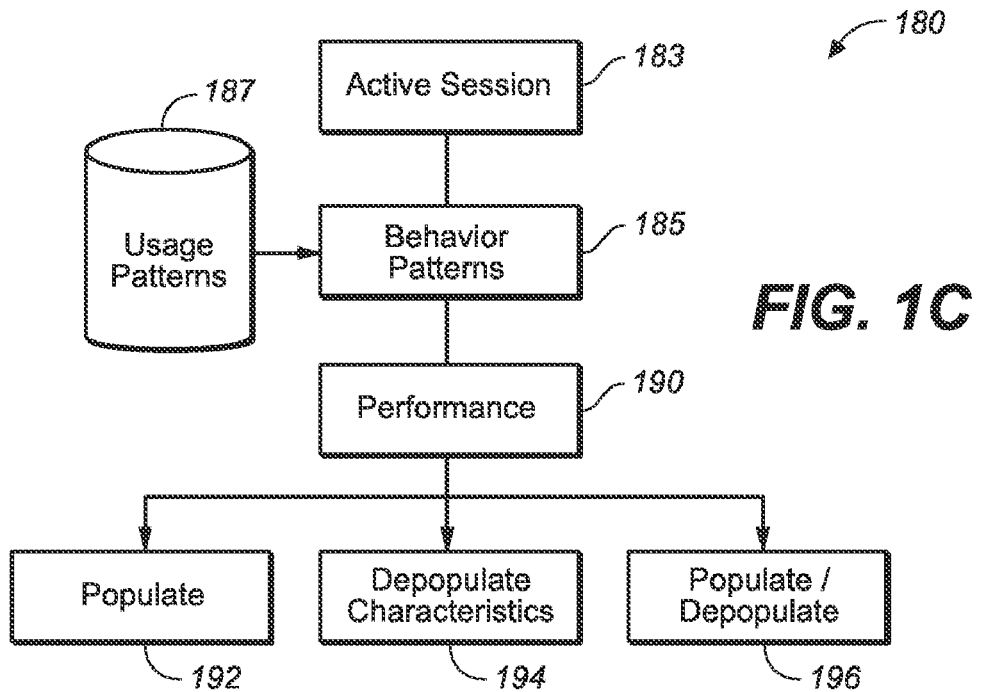
FIG. 1C sets forth a flow chart of a method for dynamically managing applications on a processing system in accordance with an implementation of the present invention, where behavior patterns of a user are provided and automatic performing of applications follows.

FIG. 1C sets forth a flow chart 180 of a method for dynamically managing applications on a processing system in accordance with an implementation of the present invention, where behavior patterns of a user are provided and automatic performing of applications follows.

From FIG. 1C, in a preferred implementation, the present invention comprises providing for a first active session in a processing system 183; providing for one or more behavior patterns of a user 185 including one or more of the user's past usage patterns and present usage patterns in relation to one or more sessions 187; and, providing for automatically performing 190, in the active session corresponding to the one or more behavior patterns 185, one or more of: populating a plurality of applications 192; depopulating one or more of a plurality of active applications 194; and populating and depopulating predetermined applications in a predetermined manner, at 196.

In one scenario, the present invention uses behavior patterns of a user to determine which applications to launch, close, or perform a combination thereof, in association with the user's behavior patterns. The behavior patterns of a user may be collected with every active session, may be determined from associated system files, or may be obtained through other sources. The behavior pattern may also include present data associated with the active session, where, for instance, if the user is repeating relational usage of applications, files, or peripheral devices, the present invention associates such usage and will act to automatically launch or close applications in accordance with such present session usage, alone or in combination with past user session data.

For instance, a user historically opens an email application, such as Outlook®, available from Microsoft Corp., immediately after system start and often concurrently seeks to thereafter open a browser application, such as Explorer®, available from Microsoft Corp., and a music player, such as ITunes®, available from Apple, Inc. Historically, based upon past behavior patterns, the user will keep their email application opened even after having no activity following an average of twenty minutes of email activity after start-up. Historically, based upon past behavior patterns, the user rarely accesses their web browser during the first twenty minutes but thereafter will primarily access their browser following its launch. Historically, based upon past behavior patterns, the user will also open a music player immediately after and sometimes before opening the browser. Historically, based upon past behavior patterns, the user will thereafter, when ready for shut down, typically close the browser, then the email and keep the music player on for an average of an extra five minutes.

In view of such behavior patterns, the present invention, in one implementation, after providing for an active session for the user, would understand the behavior patterns of the user. From that understanding, the present invention would have historical data to automatically perform first the populating of an email application after start-up and then the populating of a browser application concurrently with a music player after a predetermined period of time.

The present invention, having gathered information of the present active session, may also comparatively assess differences in routine of the user of the present session versus past sessions, and modify its automated performance acts accordingly.

In the situation where there was no determinable change to the present routines in the present session, the present invention would launch concurrently a browser application and a music player after a predetermined period of time of approximately twenty minutes. Then on shut-down sequence, the present invention would depopulate the browser first, then the email, and would not shut down for another 5 minute period. Thereafter, the present invention could also shut down the system and capture system data accordingly.

In the situation where there was a determinable change to the present routines in the present session, the present invention would detect change and modify the population, depopulation, and/or combination thereof accordingly. Thereafter, the present invention could also shut down the system and capture system data accordingly.

Managing and Interpreting Behavior Patterns

Figure 1D:
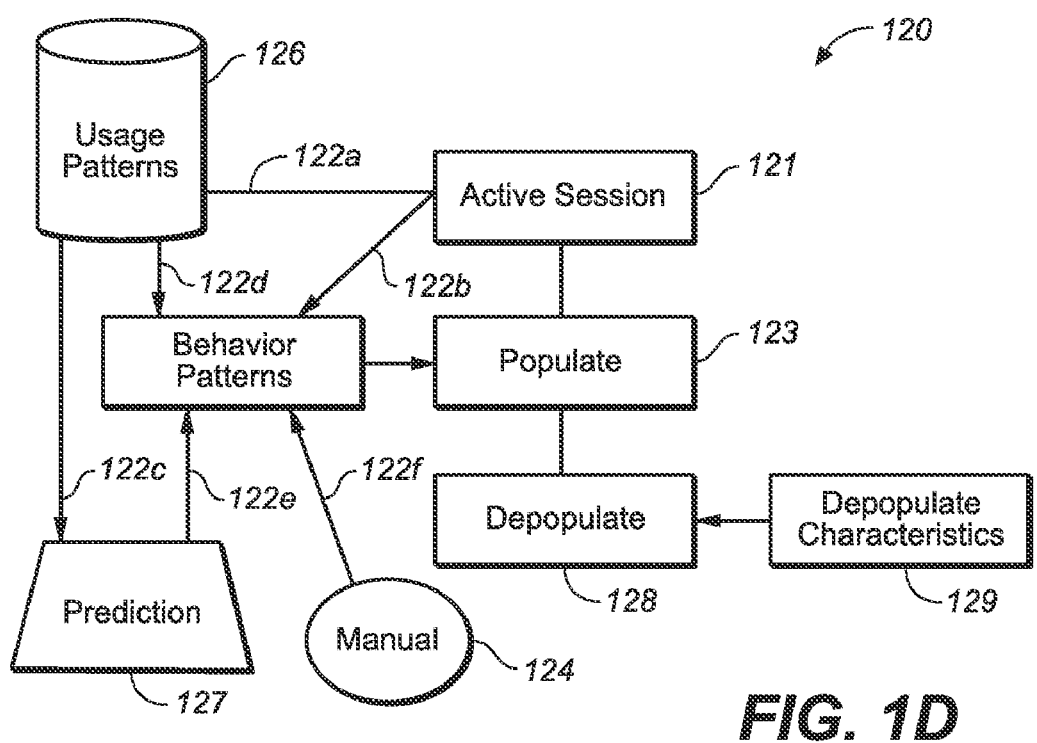
FIG. 1D is a flow chart of a method for dynamically managing applications on a processing system in accordance with an implementation of the present invention where behavior patterns are determined in relation to an active session, historical usage data, prediction methodologies, and manual input.

Further, FIG. 1D is a flow chart 120 of a method for dynamically managing applications on a processing system in accordance with an implementation of the present invention where behavior patterns 125 are determined in relation to an active session 121, historical usage data 126, prediction methodologies 127, and manual input 124.

From FIG. 1D, an active session in a processing system is provided at 121. A populating of multiple applications in the active session in relation to one or more behavior patterns 125 occurs at 123, in which, the populating is preferably automatic though such is not required by any implementation of the present invention. The behavior patterns 125 are determined in relation to one or more of the active session 121, historical usage data 126, prediction methodologies 127, and manual input 124. A capability for depopulating one or more of the multiple applications in relation to predetermined populating characteristics 129 is provided at 128. It should be understood that actions can be performed together or separately dependent upon the applications and that the acts discussed for populating may also be used for depopulating, respectively.

Additionally, in a further preferred implementation, the method and system of the present invention provides for the interpretation and management of behavior patterns as the present invention in various implementations provides for hysteresis. It will be appreciated by those skilled in the art that the behavior patterns of the present invention may be in any number of states as determined from a variety of sources in relation to one or more of the active session 121, historical usage data 126, prediction methodologies 127, and manual inputs 124, for instance. In this manner, the present invention behavior pattern output at 125 is dependent on the behavior pattern input characteristics or data that is first input, alone or in combination, in relation to a predetermined path flow to determine behavior patterns at 125.

In one scenario, the present invention uses behavior patterns of a user to determine which applications to launch, close, or perform a combination thereof, in association with the user's behavior patterns. The behavior patterns of a user being historical as having been collected with earlier active sessions at 126. The behavior pattern may also include present data associated with the active session at 121 via 122a or 122b, where, for instance, a user is repeating relational usage of certain applications, files, or peripheral devices. The behavior pattern at 125 is determined in relation to the active session and the historical data, such the present invention associates such input behaviors with a behavior pattern used to manually or automatically populate applications by launching applications in accordance with such determined input behaviors at 123.

In a further scenario, a user may connect a digital camera which thereafter triggers a detection of the camera connection to the processing system. Once detected, the present invention provides the option of automatically or non-automatically populating a plurality of applications in the active session in a predetermined manner in relation to the behavior patterns. If the behavior patterns assess historical behaviors and compare the historical behavior to the present active session behaviors to develop a predictive set of behavior patterns, the present invention is able to then populate applications in relation to the past and present needs of the user, by prediction at 127. In operation, the active session data may be dynamically compared to the historical data to determine in near real-time consistency of behaviors to present more accurate and useful behavior patterns for the present session. Similarly, weighting of behaviors can be performed with the present invention, where certain profiles, data or prediction methods weight one or more factors or files moreso than others to generate a behavior pattern that is beneficial to the user. For instance, in the above camera detection example, the active session behaviors could be recorded, thereafter compared with the historical usage patterns and/or the then active session, and if the comparison demonstrates a consistency of results, the profile of the data may be more heavily weighted.

Similarly, in a further preferred implementation, the present invention provides for one or more behavior patterns of a user 125 including one or more of the user's past usage patterns 126; present usage patterns in relation to one or more active sessions 121; a prediction method 127 which may compare the present behaviors in the active session with those of a historical nature at 126 and assess a predictive set of behavior patterns for delivery to 125 via 122e; and, a manual behavior input separate from any active session or historical data at 124. In various implementations, the present invention is able to provide for automatically performing or manually performing, in the active session corresponding to the one or more behavior patterns 125, populating a plurality of applications at 123.

Further, though hysteresis is a preferred implementation of the present invention, in a further implementation, the present invention may exhibit deterministic behavior patterns with no hysteresis in relation to only one or more of an active session, select usage patterns, select prediction methodology, or a manual input.

Further, in another preferred implementation, depopulating characteristics may be similarly determined as described above for behavior patterns where, in relation to depopulating: one or more of the user's past usage patterns; present usage patterns in relation to one or more active sessions; a prediction method which may compare the present depopulating characteristics in the active session with those of a historical nature and assess a predictive set of depopulating characteristics; and, a manual depopulating characteristic input separate from any active session or historical data; are used to determine depopulating characteristics at 129 for depopulating one or more of a plurality of active applications at 128.

Sample Operational Example of Another Preferred Implementation

Figure 2:
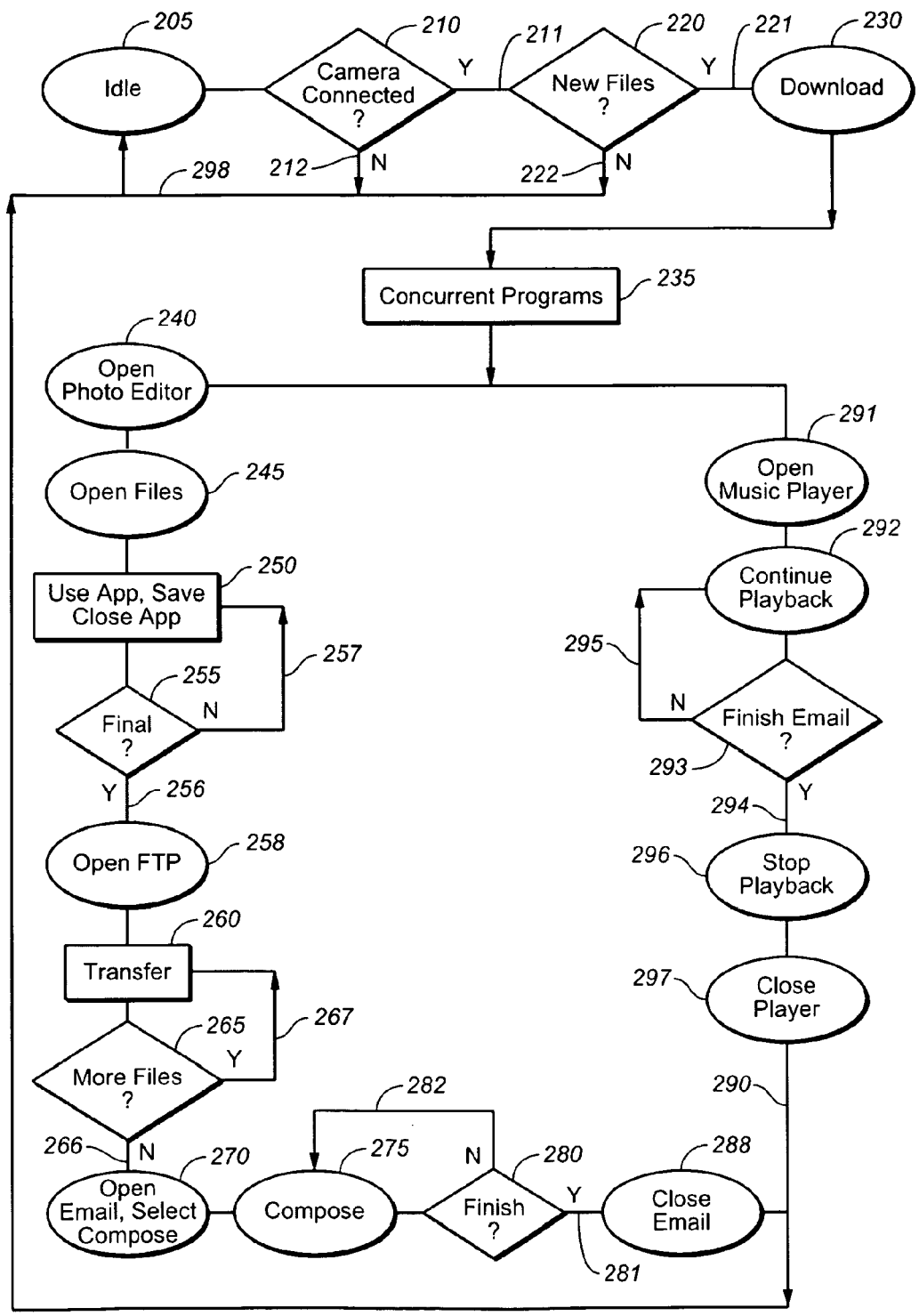
FIG. 2 illustrates a system in which a user connects a digital camera to their laptop in accordance with an implementation of the present invention.

FIG. 2 illustrates a system 200 in which a user connects a digital camera to their laptop in accordance with an implementation of the present invention. Further, FIG. 2 depicts a concurrent program implementation of the present invention is employed. Additionally, tasks of FIG. 2 set forth in an oval shape are intended to indicate automated tasks capable of being provided by the present invention in one or more implementations.

From FIG. 2, a system is idle at 205. A user may connect a digital camera which thereafter triggers a detection of the camera connection to the processing system at 210. Where detection of a camera is detected at 211, a populating sequence of the present invention is employed using a concurrent program approach for one implementation. In the event no camera detection is detected at 212, the system remains at idle at 205 via 298.

Once detected, automatically populating the plurality of applications in the active session is undertaken. In preparation for this sequence, new files are detected at 220 and if new files are presented at 221, those files are downloaded for populating at 230. If no new files are detected at 220 via 222, the system remains at idle at 205 and the populating sequence is not triggered via 298.

The populating sequence is undertaken at 235 in relation to one or more methods of populating as set forth in the present invention. For the present example, a concurrent program approach is implemented, though it will be appreciated by those skilled in the art that other approaches (including but not limited to common context of applications, concurrent applications in use, time capture of sequential application, and combinations of the aforementioned approaches, for instance).

For the concurrent program approach of the example at 235, it is recognized from the behavior patterns of the user that the user always uses a music player and a photo editor in parallel. Additionally, it is recognized from the behavior patterns that an email application is typically used by a user following the editing with the photo editor application. Accordingly, the present invention in the exemplar implementation will populate these multiple applications in accordance with present invention in relation to their use by the user based on the behavior patterns of the user.

From FIG. 2, based on user behavior patterns, a photo editor is open at 240 and a music player is open at 291. As the approach is concurrent programs at 235, the opening of these two or more (i.e., plurality) applications occurs concurrently and is automatically performed by the present invention in relation to the user's behavior patterns. It will be recognized by those skilled in the art that the use of the term plurality herein and throughout is intended to include at least two applications, and may expressly include any number of applications (such as 3-50, for instance) in relation to a user's behavior patterns and needs and is not intended to be limited to any specific number or particular range of numbers of applications.

From the left side of FIG. 2, following the opening of the photo editor at 240, files are automatically opened at 245 and the user may then act upon those opened files at 250. Once the user has completed their activity at 250, if the user's activity is complete as determined at 255 via 256, the present invention automatically opens an FTP application, again in view of the user's behavior patterns. If the user is not completed the tasks at 255, additional activity is undertaken by the user at 250 via the 257 path. The user may then transfer files (i.e., pictures from the camera as edited by the editor, for instance) at 260, where when complete at 265 via 266, the present invention automatically opens an email application at 270 for the user in view of the user's behavior patterns. In the event the user is not completed transferring files at 265, the user may continue the operation via the 267 path. Once the email application is open at 270, a composition application or task is open automatically by the present invention at 275. The user may then compose the email and include files as edited for instance at 280. Once the user has completed the email tasks at 280 via 281, the mail is sent and the present invention closes the email program at 285. The user may continue to attend to email activities via the 282 path until complete. Once the email application is closed, and other concurrent programs are closed (such as those on the right side of FIG. 2, at 291-296 to be further explained below), the present invention returns the system to idle via 290 to 299. Preferably a web browser is also opened during the activities of FIG. 2 though such is not shown in FIG. 2.

From the right side of FIG. 2, following the opening of the music player at 291 concurrent with the opening of the photo editor at 240, the music player is automatically activated to begin playback at 292 from a music list as determined by the user's behavior patterns for instance. The present invention then monitors the activity of the concurrently opened applications as well as other applications that may be open in relation to the user's behavior patterns (i.e., by example, open application B1 after closing initially opened application A1 and do not close initially open application C1 until application B1 is closed). Once the present invention determines that the email application is completed at 293 via path 294, the playback on the music player is stopped at 296 and the player is closed at 297. The music player otherwise continues to operate while the email application remains active via 293 and path 295. Once the email application is closed at 285, the music player is closed at 297 and the present invention returns the system to idle via 290 to 299.

Figure 3:
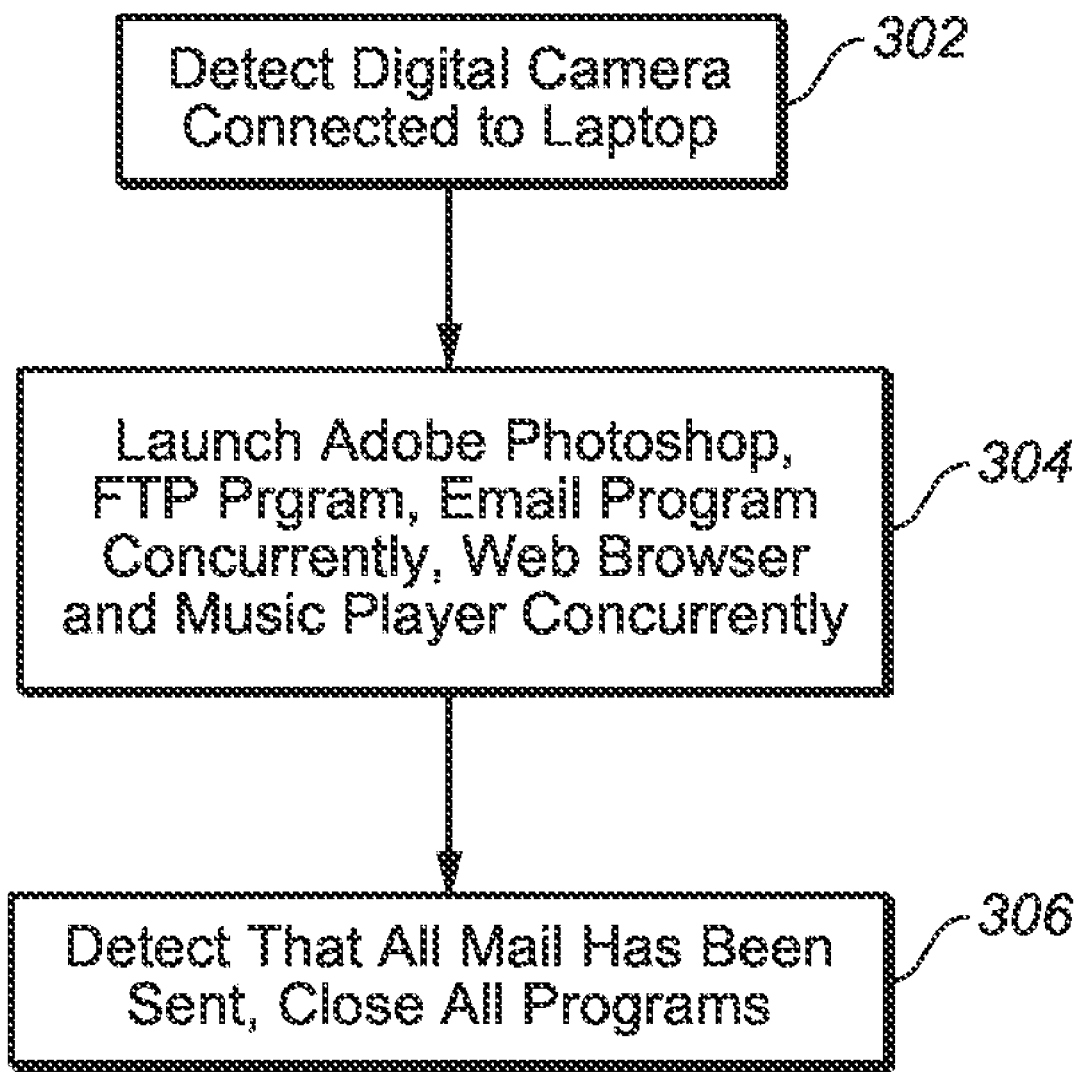
FIG. 3 is an overview of a functional flowchart for a system of FIG. 2 in accordance with an implementation of the present invention.

FIG. 3 is an overview of a functional flowchart for a system of FIG. 2 in accordance with an implementation of the present invention. From FIG. 3, a camera is detected for an active session at 302. Once detected, applications are automatically populated in relation to the user's behavior patterns such as launching a photo editing application, such as Photoshop® available from Adobe, Inc., an FTP program (to store files), an email program (to send pictures) and a web browser (to share pictures on online), via step 304. The photo editing application is closed before the opening of the FTP or email application, in which the sequences of each application being automatically opened or closed is determined in view of the user's behavior patterns. Once the email application is closed the system automatically closes the remaining programs, such as the music player in the example, in relation to the depopulating characteristics, at 306. Thereafter the system returns to idle.

Described below are different example approaches for population and depopulating applications in accordance with one or more implementations of the present invention.

Populating Approaches

Approaches to populate applications in accordance with one or more implementations of the present invention:

1. Common Context of Applications

A history of applications based on the user behavior patterns is defined within the software of the processing system according to the context of the applications, such as a photo editing application, an office suite application, and a gaming application.

2. Concurrent Applications in Use

A history of applications and their usage in relation to the applications being processed in parallel or in use concurrently is associated with a user's behavior pattern.

For example, a user always runs a media player, such as Windows Media Player (WMP-actively plays music), available from Microsoft Corp., and frequently uses an instant messaging client in parallel for their typical sessions. If an action by the user dictates that one of these programs should be launched, the present invention would automatically launch these programs in parallel, if they are not already in use.

3. Time Capture of Sequential Applications

A history of sequential applications is defined according to when they are actually being used in real-time. Accordingly the present invention would launch specific tasks or applications for the user based on the determined regular activity.

For example, a user checks various email accounts daily and typically at 5 pm. Around 6 pm, the user plays chess online with a friend. The present invention would launch the user's primary internet browser opened to the user's first email application, such as Google Gmail®, available from Google, Inc., the user's second email application, such as Yahoo! Mail®, available from Yahoo!, Inc., and the user's third email application, such as MS Windows Outlook Express®, available from Microsoft Corp., for the user at 5 pm, based upon the user's behavior pattern. Then, at 6 pm, the present invention would launch a session so the user can start their online chess game, based upon the user's behavior pattern.

4. Combinational Use of the Previous Above-Identified Methods

As will be appreciated by those skilled in the art, the approaches of each and any of the above stated approaches contain customizable parameters according to a user preference in relation to the user's behavior pattern. The present invention is situated so as to account for such customization. Examples of such parameters include thresholds for maximum number of applications to group (populate) simultaneously, maximum or minimum time between user input events used to distinguish unique operating sessions or applications of a similar task, and presentation action to take when populating.

Depopulatinq Approaches

Approaches to depopulate applications in accordance with one or more implementations of the present invention:

1. Content or Concurrent Application Grouping

Depopulation based on the grouping of the applications.

For example, in the use of Concurrent Applications, such as in the example of FIG. 2, the user always uses a media player and an InstantMessaging client in parallel. Upon detection that the user has exited from one of these programs, the present invention automatically exits the other program. It is envisioned that the present invention may be used to set such a depopulation approach as an option, as to not be intrusive to the user as well.

For example, in the use of Content of Applications, the user may currently be using a word processing application, a spreadsheet application, and a presentation application. In the present invention, where usage of two out of three of these applications stops, the present invention then automatically exits the remaining program.

2. Time-Based Method

Depopulation of applications based on a specific time.

For example, in the use of an End of work day scenario, a user's behavior indicates that the user leaves the office generally at between the hours of 5 pm to 6 pm. At 6 pm, the present invention could be used to capture the last state of the programs in use and close all applications since the user has gone home for the day. The present invention would automatically close applications. The automatic closing of applications thereby ensures the integrity of the system by reducing the possibility of a system crash with open application and data. The next day, the user could resume their work from the previous day or start with their daily start-up routine.

3. Idleness

Depopulation based on some indication of idleness or a user-defined time limit for idleness.

For example in the use of an IM away status scenario, a user may currently be using various applications in conjunction with an IM client. The user may change the status of their IM client from "Active" (green) to "Away" (yellow). Upon detection of this event, the present invention, would have related applications depopulate until the user's return to an "Active" state.

4. Sequential Ordering

Depopulation of applications following any application that is exited.

For example in the use of Partial group closing, for instance, within an application grouping, the following applications may be presented as: IBM Mobility Client®, available from International Business Machines Corp., Lotus Notes®, available from International Business Machines Corp., Sametime 7.5®, available from International Business Machines Corp., and GoGlobal®, available from GraphOn Corp. In the present invention, if the user closes out their Lotus Notes® sessions, the present invention would automatically exit Sametime 7.5® and GoGlobal® sessions as well.

5. System Resources

Depopulation of applications due to load usage and system resources.

For example in the situation of seeking to free up resources for gaming, for instance, the user may create three groupings such as: (1) Group 1—a word processing application, a spreadsheet application, and a presentation application; (2)

Group 2—a media player application, and an instant messaging application; and (3) Group 3—a browser application, and a gaming application. As Group 3 becomes active due to the user's gaming in the gaming application, the current processes from Group 2 would likely create a lag in the user's gaming environment. Upon detection by the present invention that the user is primarily engaged in Group 3 activities, the present invention would deallocate usage of Group 2 applications to enable the user a better experience. Optionally, the present invention may capture the state of the machine as well. When the user exits Group 3 and has completed gaming, the multi-media applications of Group 2 can always be restored as an option by the present invention.

6. Combinational Use of the Above-Identified Methods

Presentation of applications to the user (all known technologies).

a. Grouped Applications Based on Common Context

Figure 4:
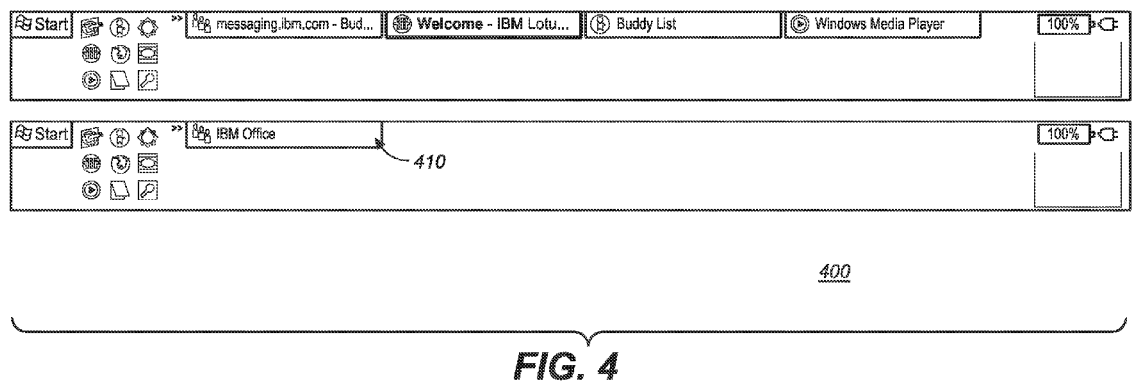
FIG. 4 is a visual depiction of an example of grouped applications based on common context using the present invention in one implementation.
Figure 5:
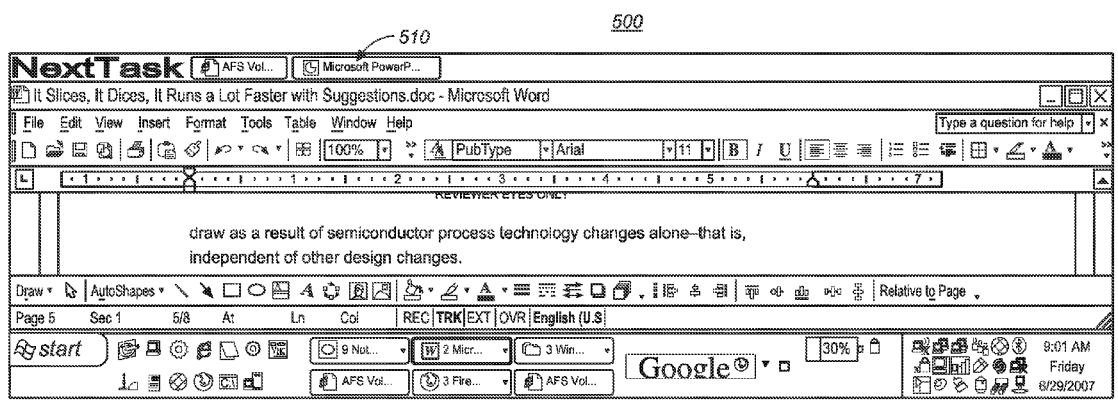
FIG. 5 is a visual depiction of an example of applications being presented in an alternate taskbar using the present invention in one implementation.

For example, the present invention is able to account for the situation where office suite applications launched at the start of work day. FIG. 4 is a visual depiction 400 of an example of grouped applications at 410 based on common context using the present invention in one implementation b. Applications are Sequentially Presented in an Alternate Taskbar For example, the present invention is able to account for the situation of presenting an alternate task bar as well. FIG. 5 is a visual depiction 500 of an example of applications being presented in an alternate taskbar at 510 using the present invention in one implementation.

c. Applications Appear on Multiple Layers

For example, applications may be situated by the present invention to appear or be displayed over multiple layers or a layered approach, for instance.

d. Applications are Presented in Various Workspaces

Figure 6:
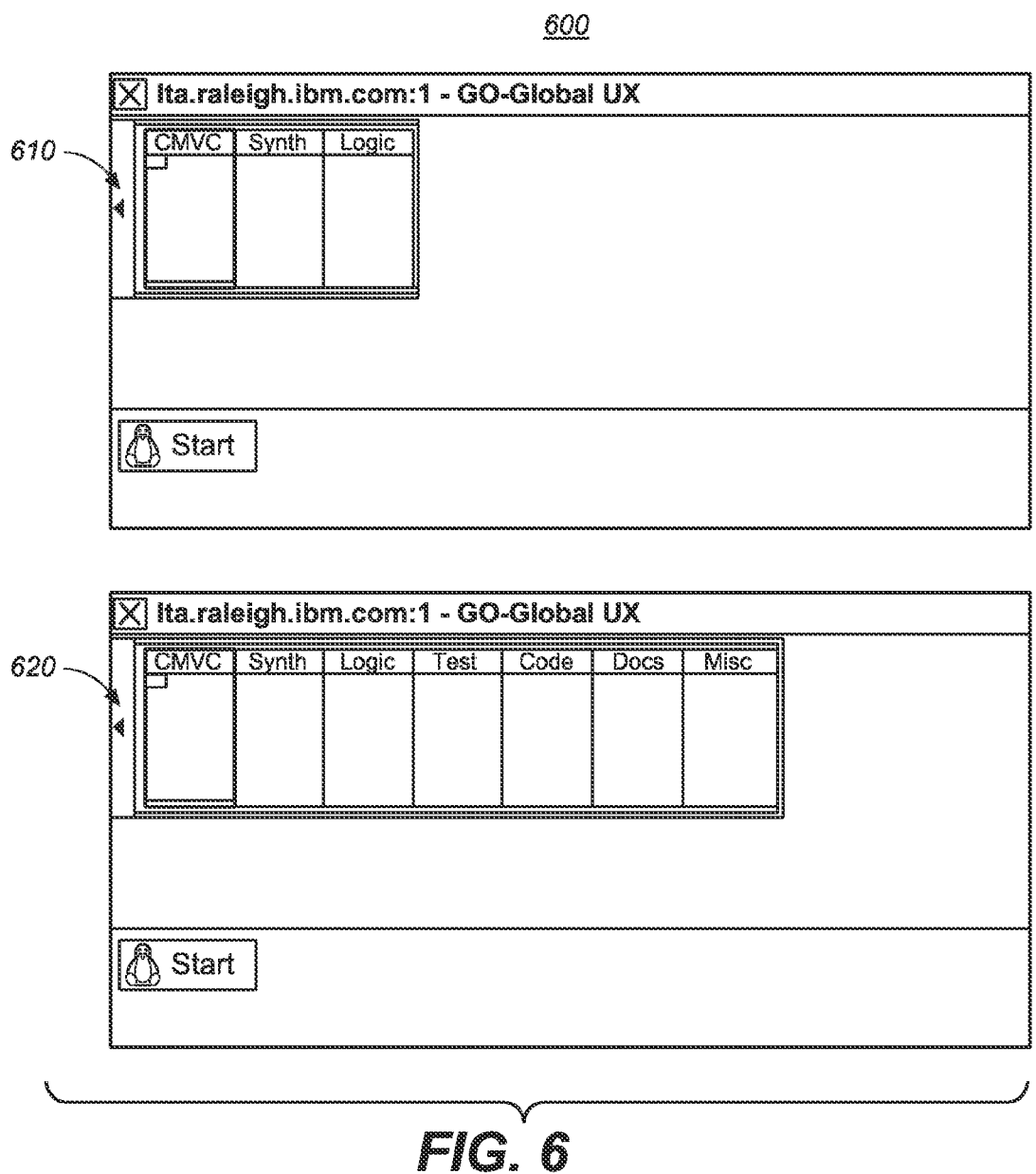
FIG. 6 is a visual depiction of an example of applications being presented in initial workspaces which then further depict additional workspace when used, using the present invention in one implementation.

FIG. 6 is a visual depiction 600 of an example of applications being presented in initial workspaces at 610 which then further depict additional workspace when used at 620, using the present invention in one implementation.

e. Applications Appear in the Foreground

For example, applications may be situated by the present invention to appear in the foreground, for instance A system and method in accordance with the present invention has numerous advantages including but not limited to those following. The present invention provides for reducing the effort required to activate commonly used applications by eliminating the need to manually locate and manage information. The present invention provides for organizing information and applications in a manner specific to user experience. The present invention provides for allowing the user to focus on the task at hand. The present invention provides for reducing the load on system resources, and additionally, is able provide an improved ease-of-use for those who are not computer experts.

The present invention may automatically or non-automatically perform as described wherein the acts of populating or depopulating may or may not be automatic in any implementation variously described herein, as the present invention is not so limited.

A system that utilizes a managing applications process in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this managing application process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for dynamically managing multiple applications on a processing system, the method comprising:
providing for a first active session in a processing system;
providing for one or more behavior patterns of a user including the user's past usage patterns and present usage patterns in relation to one or more sessions, wherein a history of applications is defined in association with the one or more behavior patterns of the user, and the user's past and present usage patterns include session data for each of: applications used by the user, sequence of applications used by the user, launch and close of applications used by the user, start and finish times of sessions of the user, one or more peripheral devices used with applications used by the user, relation of applications used by the user, common or concurrent applications used by the user, file locations of data used by the user, grouping of applications used by the user, status of the user during applications use, and activity of the user during applications use; and,
providing for automatically performing, in the active session corresponding to the one or more behavior patterns, one or more of: populating a plurality of applications; depopulating one or more of a plurality of active applications; and populating and depopulating predetermined applications in a predetermined manner.

2. The method of claim 1, wherein the automatically performing is determined in relation to the one or more behavior patterns associated with the history of applications.

3. The method of claim 2, wherein the automatically populating is determined in relation to the one or more behavior patterns corresponding to the history of applications where if a first application is launched, a second predetermined application is automatically launched concurrently in relation to the one or more behavior patterns.

4. The method of claim 1, wherein the automatically performing is determined in relation to the one or more behavior patterns associated with the history of applications where if a first application is acted upon in a predetermined manner, a second predetermined application is automatically acted upon in a predetermined in parallel in relation to the one or more behavior patterns.

5. The method of claim 4, wherein the automatically performing is determined to be one of launching applications where the first application is launched first and the second application is automatically launched in parallel corresponding to the one or more behavior patterns.

6. The method of claim 1, wherein a history of applications is defined in accordance with a customized set of one or more behavior patterns which comprise one or more of:
each of the plurality of applications have a common context, a history of applications is defined in accordance with applications being utilized concurrently, and a history of applications is defined in accordance with applications being processed in parallel.

7. The method of claim 6, wherein the automatically performing is populating is in relation to the customized set of one or more behavior patterns associated with the history of applications for one or more of:
each of the plurality of applications having a common context, a history of applications is defined in accordance with applications being utilized concurrently, and a history of applications is defined in accordance with applications being processed in parallel.

8. The method of claim 1, wherein the automatically performing is depopulating in relation to predetermined depopulating characteristics being a grouping of the applications as concurrent applications where if a first application is detected as being exited, a second predetermined application is automatically exited in relation to the one or more behavior patterns.

9. The method of claim 1, wherein the automatically performing is depopulating determined in relation to predetermined depopulating characteristics being a grouping of the applications in relation to context of applications, where if a first predetermined and a second predetermined application are detected as exited, a third application is automatically exited in relation to the one or more behavior patterns.

10. The method of claim 1, wherein the automatically performing is depopulating determined in relation to predetermined depopulating characteristics being one of:
(1) a specific time, where if a predetermined time is detected, a final state of applications in use at the predetermined time is captured, and automatic exiting of applications occurs automatically, and (2) a state of idleness, where if a predetermined idleness state or idle time is detected, a final state of applications in use at the predetermined idleness state or idle time is captured, and automatic exiting of applications occurs automatically.

11. The method of claim 1, wherein the automatically performing is a combination of populating and depopulating with respective applications and the performing with respect to respective applications is determined in relation to the one or more behavior patterns corresponding to the history of applications, and the depopulating is determined in relation to predetermined depopulating characteristics.

12. A method for adaptively managing a plurality of applications on a computer-based processing system including a computer, a camera, and program applications resident on the computer, the method comprising:
providing an active session on the computer; detecting a presence of the camera being interoperable with the computer; providing for automatically populating the plurality of applications in the active session in relation to one or more behavior patterns, including one or more of the user's past usage patterns and present usage patterns corresponding to the detected camera, wherein each of the plurality of applications have a common context, wherein a history of applications is defined in association with the one or more behavior patterns of the user, and the user's past and present usage patterns include session data for each of: applications used by the user, sequence of applications used by the user, launch and close of applications used by the user, start and finish times of sessions of the user, one or more peripheral devices used with applications used by the user, relation of applications used by the user, common or concurrent applications used by the user, file locations of data used by the user, grouping of applications used by the user, status of the user during applications use, and activity of the user during applications use, and providing for a capability to depopulate one or more of the plurality of applications upon detecting a removal of the detected presence of the camera or the inoperability of the camera with the computer, wherein the behavior patterns are determined in relation to a history of applications corresponding to the context of the applications.

13. The method of claim 12 further comprising, determining a presence of one or more new files on the camera, downloading one or more digital files from the one or more new files determined;
automatically and concurrently populating a file editing application and a music player application, and opening the one or more downloaded digital files into the file editing application for editing and opening the music player application.

14. The method of claim 12 further comprising, launching an email program application and selecting to compose a new email;
sending a composed email closing the email program application; and
transferring one or more closed files from the editing application to a FTP program application.

15. A computer program product encoded on a non-transitory computer-readable medium for dynamically managing a plurality of applications on a processing system, the processing system comprising a computer, a storage medium, and a processor, the computer program product comprising program instructions for:
providing an active session in a processing system;
providing for automatically populating the plurality of applications in the active session in relation to one or more behavior patterns of a user including the user's past usage patterns and present usage patterns in relation to one or more sessions, wherein a history of applications is defined in association with the one or more behavior patterns of the user, and the user's past and present usage patterns include session data for each of: applications used by the user, sequence of applications used by the user, launch and close of applications used by the user, start and finish times of sessions of the user, one or more peripheral devices used with applications used by the user, relation of applications used by the user, common or concurrent applications used by the user, file locations of data used by the user, grouping of applications used by the user, status of the user during applications use, and activity of the user during applications use; and
providing for a capability to depopulate one or more of the plurality of applications in relation to one or more predetermined depopulating characteristics.

16. The computer program product of claim 15 wherein a history of applications is defined in accordance with applications being utilized concurrently and the automatically populating is determined in relation to the one or more behavior patterns of the history of applications where if a first application is launched, a second application is automatically launched concurrently in relation to the one or more behavior patterns.

17. The computer program product of claim 15 wherein a history of applications is defined in accordance with applications being processed in parallel, and the automatically populating is determined in relation to the one or more behavior patterns of the history of applications where if a first application is launched, a second application is automatically launched in parallel in relation to the one or more behavior patterns.

18. A computer system comprising:
- a processor;
- a storage medium; and
- a computer readable memory coupled to the processor and containing program instructions that, when executed, implement a method in an active session of a processing system providing for: automatically populating the plurality of applications in the active session in relation to one or more behavior patterns of a user including one or more of the user's past usage patterns and present usage patterns in relation to one or more sessions, wherein a history of applications is defined in association with the one or more behavior patterns of the user, and the user's past and present usage patterns include session data for each of: applications used by the user, sequence of applications used by the user, launch and close of applications used by the user, start and finish times of sessions of the user, one or more peripheral devices used with applications used by the user, relation of applications used by the user, common or concurrent applications used by the user, file locations of data used by the user, grouping of applications used by the user, status of the user during applications use, and activity of the user during applications use; and
- providing for a capability to depopulate one or more of the plurality of applications in relation to one or more predetermined depopulating characteristics.

* * * * *